H. J. HAIGH.
BAKING PAN.
APPLICATION FILED SEPT. 22, 1917.
1,291,490.
Patented Jan. 14, 1919.
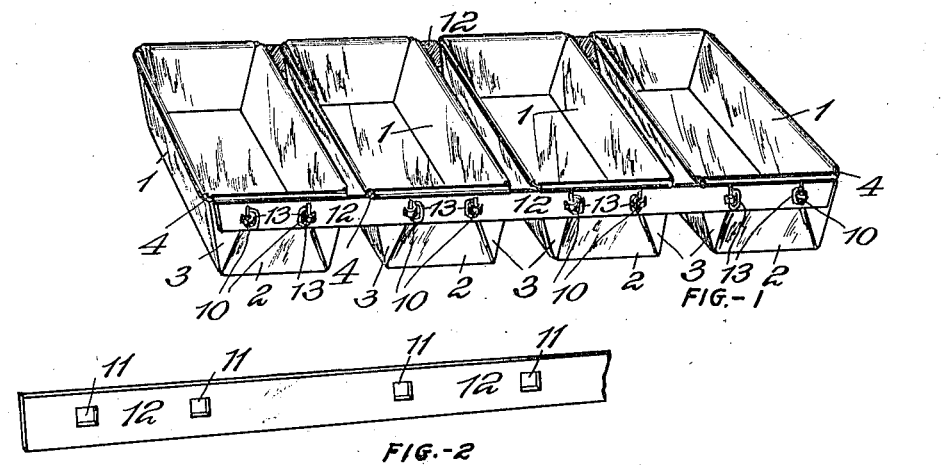
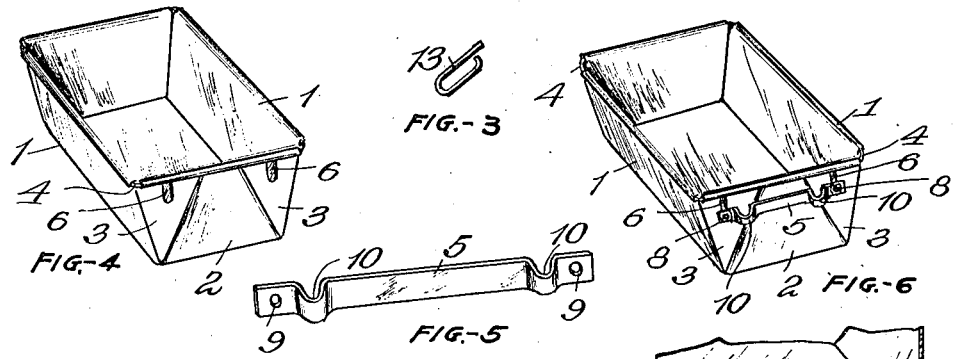
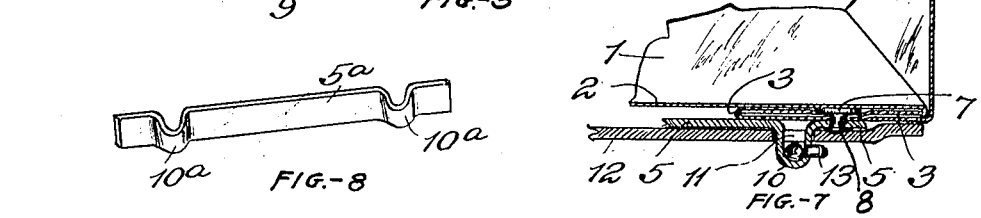
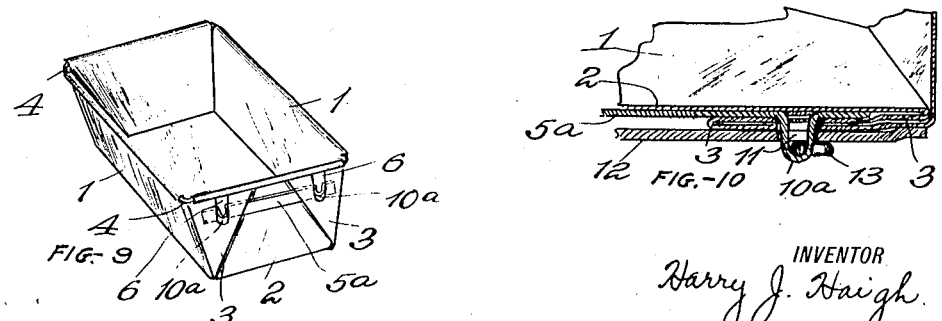
INVENTOR
Harry J. Haigh.
BY
Criswell & Davis
his ATTORNEYS

UNITED STATES PATENT OFFICE.

HARRY J. HAIGH, OF NEW YORK, N. Y.

BAKING-PAN.

1,291,490.

Specification of Letters Patent.  Patented Jan. 14, 1919.

Application filed September 22, 1917.   Serial No. 192,735.

*To all whom it may concern:*

Be it known that I, HARRY J. HAIGH, a citizen of the United States, and a resident of Stapleton, county of Richmond, city and State of New York, have invented certain new and useful Improvements in Baking-Pans, of which the following is a specification.

This invention relates to that class of baking pans in which a plurality of individual pans are connected together to form a multiple pan, or a set of pans adapted to be handled as a unit, and it is especially applicable to baking pans for use in bakeries where the pans must be rigidly held together to withstand severe usage.

The principal object of the invention is to provide simple means for detachably connecting the individual pans together, whereby a damaged or worn pan may be removed from the set and a new pan substituted therefor, or the relative positions of the pans of a set changed to present a different pan or pan surface at the point or points of greatest wear.

Another object of the invention is to provide simple, light, and inexpensive means for rigidly and detachably holding the individual pans together in spaced relation so that a free circulation of heated air between the pans will be permitted without the use of rivets or other fastening devices projecting within the pans, thus avoiding the formation of marks on the articles baked in the pans and the unsanitary conditions resulting from the presence of rivet heads or other projections on the interior of the pans.

A further important object of the invention is to provide a knock-down multiple pan in which the individual pans may be of standard construction and adapted to be detachably and interchangeably connected with a standard form of connecting means.

Another important object of the invention is to provide means held to the corner folds at the end walls of the pans adapted to be detachably secured to the pan connecting means for rigidly holding the pans against relative movement in any direction.

A further object of the invention is to provide a standard form of individual pan having a bracket secured at each end thereof formed with projections adapted to be interlocked with a standard form of connecting bar, which brackets shall be supported at their opposite ends by the corner folds of the pan.

In the drawings,

Figure 1 is a perspective view of a multiple baking pan illustrating one embodiment of the invention;

Fig. 2 a fragmentary perspective view showing a portion of one of the pan-connecting bars;

Fig. 3 a detail view of one of the locking pins;

Fig. 4 a perspective view of one of the individual pans with the end bracket removed;

Fig. 5 a perspective view showing one form of end bracket;

Fig. 6 a perspective view of an individual pan equipped with the end bracket shown in Fig. 5;

Fig. 7 a fragmentary horizontal sectional view of the pan shown in Fig. 5;

Fig. 8 a perspective view of a modified form of end bracket;

Fig. 9 a perspective view of one of the individual pans equipped with the form of end bracket shown in Fig. 8; and Fig. 10 a fragmentary horizontal sectional view of the pan shown in Fig. 9.

The individual pans 1, with the exception of the end brackets and the manner of connecting the same to the end walls of the pan, are of well-known construction. These pans are pressed from a sheet metal blank and the surplus metal at the corners of the pan is bent flatly against the end walls 2, forming substantially V-shaped end or corner folds 3 at each side of the end walls. The pans are each provided with a beaded upper edge formed by bending the edges of the side and end walls outwardly and downwardly around a rectangular wire reinforcing frame 4.

The individual pans 1 are provided at each end with a bracket or locking member 5, supported at its opposite ends by the two corner folds 3. Each of the corner folds 3 is provided with a vertical slot 6 extending downwardly through both thicknesses of the fold from the upper edge thereof. A rivet is passed into each of the slots 6, with the flat base 7 thereof lying between the outer side of the end wall 2 of the pan and the inner side of the fold 3, and the stem or shank 8 thereof projecting outwardly through the slot. The outer ends of the shanks 8 of the rivets extend through apertures 9 in the ends of the brackets 5 and are headed against the outer sides of the brackets, as shown in Figs. 6 and 7, thus securely holding the brackets to the corner folds 3 of the pans.

Each of the brackets 5 is provided with two spaced outwardly projecting portions 10 formed by bending the brackets laterally to form substantially U-shaped offset portions adapted to project through apertures 11 in connecting bars 12. Two of the connecting bars 12 are employed with each set of pans, said bars extending along the end walls of all of the pans of the set at opposite sides of the multiple pan, with their upper edges engaging under the beaded edges of the end walls of the pans. The bars 12 are detachably locked in place against the ends of the pans by means of suitable locking pins 13 which pass through the U-shaped projections 10 and are bent about the same to prevent accidental loss of the pins.

In the modified construction shown in Figs. 8, 9 and 10, the rivets are dispensed with. In this form of pan the brackets 5ª are formed with U-shaped offset portions or projections 10ª adjacent the opposite ends thereof. The ends of each bracket are passed downwardly between the outer side of the end wall 2 of the pan and the inner sides of the corner folds 3 with the projections 10ª extending through the vertical slots 6 in the corner folds, as shown in Figs. 9 and 10. The projections 10ª pass through apertures 11 in the connecting bars 12 and the bars are detachably locked in place by pins 13, in the manner heretofore described in connection with the form of pan shown in Figs. 1 to 7.

While I have shown four pans connected together to form a set, it will be obvious that any desired number of pans may be connected together. It will also be obvious that instead of the slots 6, the end folds may be provided with suitable apertures, and the rivets passed therethrough before the corner folds are bent against the end walls of the pans, if desired. It will also be obvious that the brackets may be formed with apertured lugs or ears instead of the U-shaped projections 10, if desired.

From the foregoing it will be seen that simple means has been provided for rigidly connecting together a plurality of baking pans in such a manner that any pan of a set may be readily removed and a new pan substituted therefor, or the relative positions of the pans changed. It will also be seen that the various parts are interchangeable and may be readily assembled.

What I claim is:

1. A multiple baking pan comprising a plurality of individual pans having corner folds lying against the exterior thereof, and separably connected devices held solely to the corner folds of the pans for detachably locking the pans together and holding the pans against relative vertical and horizontal movement.

2. A knockdown multiple baking pan comprising a plurality of individual pans having corner folds lying against the end walls thereof, and means interlocked solely with the corner folds of the individual pans for detachably holding the pans against relative vertical and horizontal movement.

3. An interchangeable pan unit for a knockdown multiple baking pan, comprising a rectangular metal pan formed with corner folds lying against the exterior of oppositely disposed walls of the pan, and means supported solely by said corner folds at opposite sides of the pan adapted to be detachably held to pan connecting means.

4. The combination with a rectangular metal pan formed with corner folds lying against the end walls thereof, of brackets held to the end walls of the pans and supported solely by said corner folds, said brackets having projecting portions adapted to be detachably interlocked with pan-connecting members.

5. The combination with a rectangular metal pan formed with corner folds lying against the end walls thereof, of brackets extending across the end walls of the pans and rigidly held at their ends to said corner folds, said brackets having outwardly projecting portions adapted to be detachably interlocked with pan-connecting members.

6. The combination of a series of pans arranged in juxtaposition and having corner folds lying against the exterior thereof, brackets carried by said folds, and means detachably held to said brackets for rigidly connecting the pans of the series together.

7. A knockdown multiple baking pan comprising a series of rectangular individual pans arranged side by side and having corner folds lying against the end walls thereof, connecting bars extending along the end walls of the series of pans, and means for detachably securing the corner folds of the pans to said connecting bars to hold the pans against relative vertical and horizontal movement.

8. A multiple baking pan comprising a series of rectangular individual pans arranged side by side and having corner folds lying against the end walls thereof, connecting bars extending along the end walls of the series of pans, and means supported on the corner folds of the pans adapted to be detachably connected to said bars to lock the series of pans together.

9. The combination of a series of rectangular pans arranged side by side in spaced relation and having corner folds lying against the end walls thereof, connecting bars extending along the end walls of the pans, and means supported on the corner folds of the pans adapted to interlock with said bars to rigidly and detachably hold the pans in spaced relation.

10. The combination of a series of rectangular pans arranged side by side in spaced relation and having corner folds lying against the end walls thereof, connecting bars extending along the end walls of the pans, brackets secured at their ends to the corner folds only of the pans, and means for detachably locking the connecting bars to said brackets.

11. The combination of a series of rectangular pans arranged side by side in spaced relation and having corner folds lying against the end walls thereof, connecting bars extending along the end walls of the pans and provided with a series of apertures, brackets carried by the corner folds of the pans and formed with projecting portions adapted to engage in the apertures in said bars, and means for detachably holding said bars and brackets in interlocked relation.

12. The combination of a series of rectangular pans arranged side by side in spaced relation, said pans having beaded upper edges and corner folds lying against the end walls of the pans, brackets supported on the corner folds of the pans and having outwardly projecting portions, connecting bars extending along the end walls of the pans with their upper edges engaging under the beaded edges of the end walls, said bars having apertures through which the projecting portions of the brackets extend, and means for detachably locking the connecting bars to said brackets.

13. A multiple baking pan comprising a series of rectagular pans arranged in juxtaposition and having corner folds lying against the exterior thereof, brackets held solely to the corner folds of the pans, bars extending along opposite sides of the series of pans, and interlocking separable connections between said bars and brackets.

14. The combination with a rectangular metal pan having corner folds lying against the end walls thereof, said folds being formed with slots extending downwardly from the upper edge thereof, of brackets adapted to interlock with means for connecting a plurality of pans together, said brackets being held to the end walls of the pans by rivets having their heads confined between the folds and the outer surface of the pan wall and their shanks extending through said slots and the brackets.

15. The combination with a rectangular metal pan having corner folds lying against the end walls thereof, said folds being formed with slots extending downwardly from the upper edge thereof, of metal straps lying against the end walls of the pans and formed with U-shaped outwardly offset portions extending through the slots in the folds, the ends of said straps being confined between the folds and the pan wall.

16. The combination of a series of rectangular pans arranged side by side in spaced relation and having corner folds lying against the end walls thereof provided with slots extending downwardly from the upper edges of the folds, brackets having the ends thereof confined between the folds and the pan walls, said brackets having outwardly projecting portions adjacent their ends extending through the slots in the folds, bars extending along the end walls of the pans and provided with apertures through which the projections on the brackets extend, and means for detachably locking the bars to the brackets.

This specification signed this 20th day of September, A. D. 1917.

HARRY J. HAIGH.